United States Patent [19]

Zapke et al.

[11] Patent Number: 5,014,744
[45] Date of Patent: May 14, 1991

[54] SHUT-OFF DEVICE

[75] Inventors: Klaus Zapke, Maintal; Johannes Löffler, Bad Homburg, both of Fed. Rep. of Germany

[73] Assignee: Metallgesellschaft Aktiengesellschaft, Frankfurt am Main, Fed. Rep. of Germany

[21] Appl. No.: 468,474

[22] Filed: Jan. 22, 1990

[30] Foreign Application Priority Data

Jan. 20, 1989 [DE] Fed. Rep. of Germany ....... 3901576

[51] Int. Cl.⁵ .............................................. F16K 25/00
[52] U.S. Cl. .................. 137/614.21; 251/185; 251/192
[58] Field of Search ........................ 251/185, 180, 192; 137/614.11, 614.18, 614.21

[56] References Cited

U.S. PATENT DOCUMENTS

| | | | |
|---|---|---|---|
| 2,261,535 | 11/1941 | Wheatley | 137/614.21 |
| 3,130,952 | 4/1964 | Meyer | 251/185 |
| 3,406,943 | 10/1968 | Newell | 251/192 |
| 4,244,393 | 1/1981 | Lehtinen | 251/185 |
| 4,559,972 | 12/1985 | Wolf et al. | 137/614.11 |

Primary Examiner—A. Michael Chambers
Attorney, Agent, or Firm—Herbert Dubno

[57] ABSTRACT

In a housing having an inlet opening and an outlet opening, the shut-off mechanism has a rotary plug for interrupting the flow of flowable material through the housing. Via the rotary plug the outlet opening is gas-tightly sealed and a flow of material through the inlet opening is prevented. The rotary plug is provided with a sealing member, which is rotatable about an axis which is approximately at right angles to the axis of rotation of the rotary plug. The sealing member cooperates with the valve seat, which is associated with the outlet opening. A compression spring extends between the sealing member and the rotary plug and is laterally spaced from the axis of rotation of the sealing member. Upon a movement of the rotary plug the compression spring will impart a certain rotation of the sealing member without a need for a drive.

18 Claims, 3 Drawing Sheets

SHUT-OFF DEVICE

FIELD OF THE INVENTION

Our present invention relates to a shut-off device or mechanism for bulk-material dispensers, hoppers or other apparatus for the handling of flowable materials and in which a gastight environment must be maintained. More particularly, the invention relates to a shut-off device in which a housing provided with an inlet opening and an outlet opening contains a rotary plug member which serves to interrupt the flow of the flowable material through the housing in that the outlet opening is gas-tightly closed and the inlet opening is closed at the same time.

BACKGROUND OF THE INVENTION

A mechanism of the type with which the invention is concerned is described in U.S. Pat. No. 4,559,972. A sealing plate is connected by a linkage to the rotary plug, which closes the inlet opening. When that mechanism is in its closed position, the sealing plate will always assume the same position on the valve seat, which is associated with the outlet opening. This may result in the accumulation of contaminants or a high rate of wear leading to loss of sealing or to maintenance problems.

OBJECTS OF THE INVENTION

It is an object of the invention to ensure that the sealing member which cooperates with the valve seat associated with the outlet opening will assume a different position as a result of each closing operation.

Another object is to provide a shut-off device of the type described which is free from drawbacks of the prior art device.

SUMMARY OF THE INVENTION

These objects are achieved in accordance with the invention in that the rotary plug is provided with a sealing member which cooperates with the valve seat associated with the outlet opening and is rotatable about an axis approximately at right angles to the axis of rotation of the rotary plug.

More particularly the device of the invention comprises:

a housing;

means forming an inlet on the housing for admitting a flowable material to the housing;

means forming an outlet in the housing for discharging the flowable material, and defining in the housing an annular seat around the outlet;

a rotary plug member in the housing rotatable about a first axis relative to the housing between a position communicating between the inlet and the outlet to permit flow of the material and a position blocking flow of the material between the inlet and the outlet and closing the inlet; and a sealing member rotatable relative to the plug member about a second axis generally at a right angle to the first axis, sealingly engageable with the seat in the position blocking flow and rotated at least limitedly upon displacement of the plug member between the positions to vary orientation of the sealing member about the second axis relative to the seat.

Because the sealing member is rotatable, the sealing member when it is not in its sealing position will be rotated to a larger or smaller extent about its axis by incidentally occurring turning moments and during each subsequent closing operation will assume a different position on the stationary valve seat. The sealing member need not be rotated by hand or by a motor.

According to a feature of the invention a compression spring is provided between the sealing member and the rotary plug and is disposed beside, i.e. alongside, the axis of rotation of the sealing member.

The compression spring provides a resilient connection between the rotary plug and the sealing member and urges the sealing member into its sealing position against the valve seat. Because the compression spring is asymmetrically arranged beside the axis of rotation of the sealing member the compression spring will intensify the action of a turning moment exerted during a movement of the sealing member. As has been explained, this turning moment will cause the sealing member to rotate about its axis of rotation through a larger or smaller angle.

Advantageously, the sealing member comprises a spherical cap and the housing has a guiding surface which conforms to the surface of the spherical cap. As the sealing member moves away from the valve seat to its open position the spherical outside surface of the sealing member will slide along the guiding surface so that any solids which have accumulated adjacent to the valve seat will be pushed aside by the sealing member.

Under the action of the off-center compression spring the sealing member will perform a rotary movement whenever it is moved away from or toward the valve seat. This is due to the fact that the friction between the sealing member and the valve seat and/or the guiding surface will inevitably result in turning moments, which are desired in the present case.

This leads to a desirable smoothing between the sealing member and the valve seat.

It is important to ensure that the sealing member is freely rotatable about its axis of symmetry, which is approximately at a right angle to the axis of rotation of the rotary plug. The rotary mounting for the sealing member must be so designed that the sealing member is coupled to the rotary plug in such a manner that upon a rotation of the rotary plug the latter will move the sealing member to its open and closed positions. That coupling can be effected by a connecting element or by a suitable shape of the parts to be coupled.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
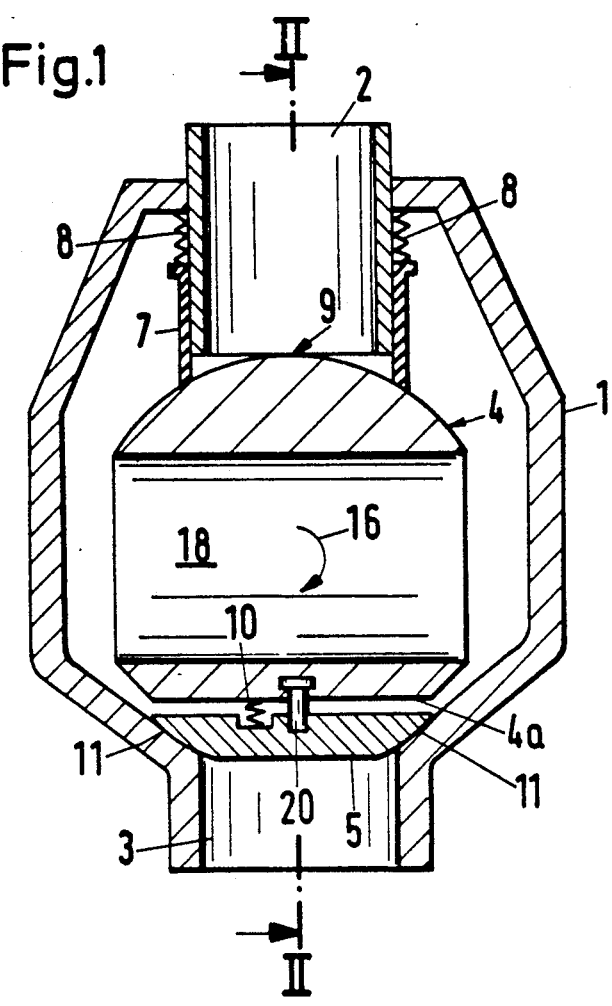
FIG. 1 is a diagrammatic longitudinal sectional view taken along line I—I of FIG. 2 and showing the shut-off mechanism.

The shut-off mechanism shown in FIG. 1 comprises a housing 1 having an inlet duct 2 and an outlet duct 3. The mechanism also comprises a rotary plug 4 and a sealing member 5. The inlet duct 2 is joined to the housing and is surrounded by a sealing ring 7, which is biased by compression springs 8.

In the closed position shown in FIG. 1 the sealing ring 7 bears on a spherical surface 9 of the rotary plug so that a downward flow of granular and dustlike solids through the inlet duct 2 is prevented. A gas-tight seal of the shut-off mechanism is effected by the sealing member 5, which by a compression spring 10 is urged against the valve seal 11, which belongs to the housing 1.

Figure 2:
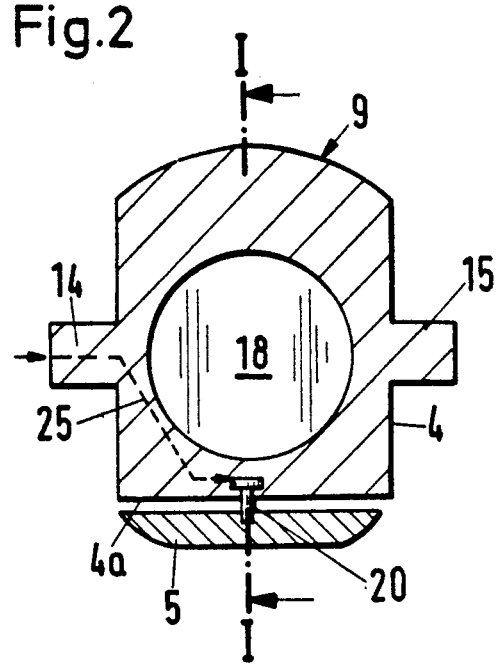
FIG. 2 is a longitudinal sectional view taken along line II—II of FIG. 1 and showing the rotary plug and the sealing member.
Figure 8:
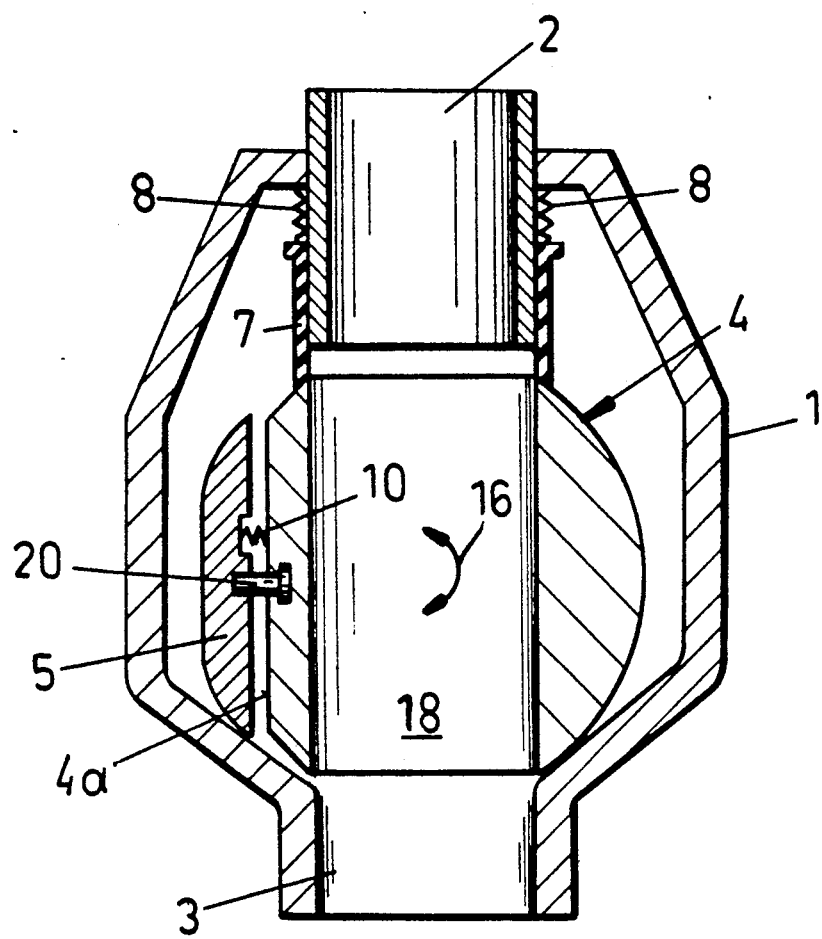
FIG. 8 is a view similar to FIG. 1 showing the valve in its open position.

To open the shut-off mechanism the rotary plug 4 is rotated by drive means, not shown, about the trunnions 14 and 15, see FIG. 2, on an axis which is at right angles to the paper plane of FIG. 1. That rotation from the closed position to the open position (see FIG. 8) is indicated in FIG. 1 by the curved arrow 16. As the rotary plug 4 is moved from its closed position to its open position the sealing member 5 will also be moved away from the valve seat 11 and the central passage 18 formed in the rotary plug, see FIGS. 1 and 2, will assume a position in alignment with the inlet duct 2 and the outlet duct 3 so that they communicate with each other.

The outside surface of the sealing member 5 cooperates with the valve seat 11 and has the shape of a segment of a sphere. The sealing member is rotatably mounted on the rotary plug 4 by a centering pin 20, see FIGS. 1 to 3, which is connected to the sealing member 5. As a result, the sealing member can rotate about its axis of symmetry, which coincides with line II—II in FIG. 1 and with line I—I in FIG. 2.

Figure 3:
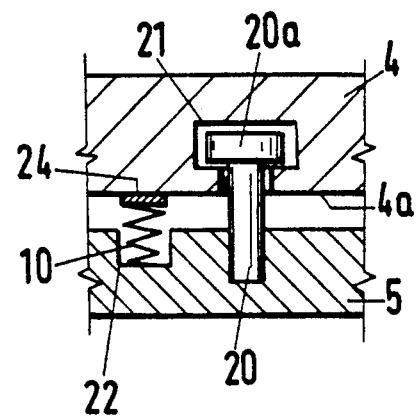
FIG. 3 is a sectional view which shows on a scale which is larger than that in FIGS. 1 and 2 the rotary point between the rotary plug and the sealing member.

The pin 20 has an enlarged head 20a, which extends with a small clearance into a bearing chamber 21, which is shown in FIG. 3.

Figure 4:
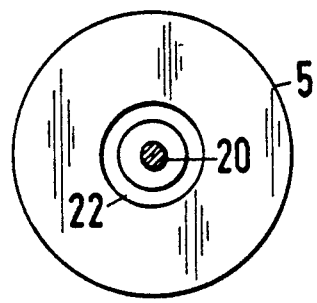
FIG. 4 is a top plan view showing the sealing member of FIGS. 1 to 3.

The compression spring 10 is laterally spaced from the centering pin 20 and is not connected to the rotary plug 4 and/or the sealing member 5 and preferably is non-connected to both parts. The spring 10 extends into a recess 22, which consists of a blind hole or which is annular (see particularly FIGS. 3 and 4). To permit the compression spring 10 to slide freely over the flat surface 4a of the rotary plug 4, the spring 10 is connected to a sliding disk 24, as is shown in FIG. 3. The other end of the compression spring may also be provided with a sliding disk, not shown, if the compression spring extends in the sealing member 4 in an annular recess 22 rather than in a blind hole.

It is important that the radial distance from the compression spring 10 to the axis of rotation of the sealing member remain approximately constant during the operation of the shut-off mechanism. As has been explained hereinbefore it is an object of the compression spring 10 to force the sealing member 5 against the valve seat 11 and to ensure that the sealing member 5 will perform a certain rotation, which may be slight, about its axis of rotation during movements of the rotary plug 4. In the embodiment shown in FIGS. 1 to 4 and 8 the axis of rotation of the sealing member coincides with the longitudinal axis of the centering pin 20. The rotary movements of the sealing member 5 will have the result that the sealing surfaces of the sealing member and of the valve seat smoothen each other in operation and that solids will be removed from the valve seat so that a high gas-tightness will be preserved through a long time of operation.

In most cases the distance between the flat surface 4a of the rotary plug 4 and the confronting top surface of the sealing member 5 is about 0.5 to 3 mm. That distance must not be excessively large so that solids cannot or can hardly enter the gap. It may be desirable continuously or periodically to supply a purging fluid from the outside through a line 25, which is indicated by broken lines in FIG. 2, to the bearing chamber 21 and from the latter into the gap between the rotary plug 4 and the sealing member 5. The purging fluid may consist, e.g., of water vapor or liquid lubricant. In a manner which is not shown such a purging line may also be used to purge the valve seat 11 and its environment by fluid coming from the rotary plug 4.

Figure 5:
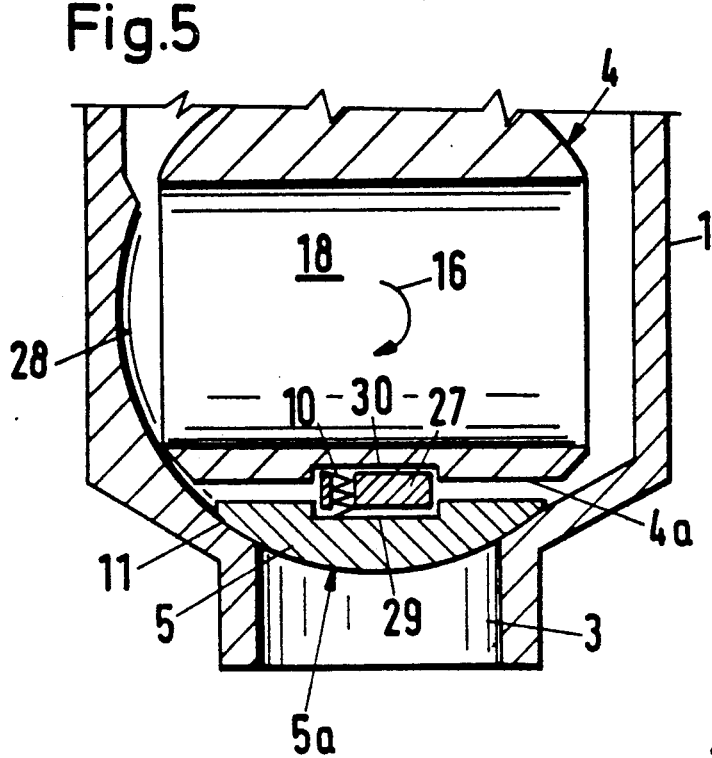
FIG. 5 is a longitudinal sectional view which is similar to FIG. 1 and shows a second embodiment of the design of the rotary plug and of the sealing member.
Figure 6:
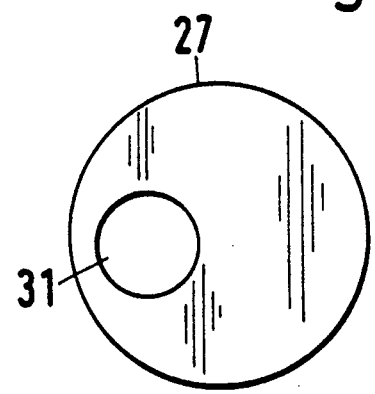
FIG. 6 is a top plan view showing the centering disk of FIG. 5.

The modified shut-off mechanism shown in FIGS. 5 and 6 differs from the embodiment shown in FIGS. 1 to 4 and 8 in that the centering pin 20 has been omitted and the valve member 5 is guided by a centering disk 27 and a guiding surface 28. In that case the sealing member can also rotate about its axis of symmetry, which is at right angles to the axis of rotation of the rotary plug 4.

The cylindrical centering disk 27 is shown in a top plan view in FIG. 6 and partly extends into a recess 29 formed in the sealing member 5. The centering disk 27 extends also into a recess 30 that is formed in the flat surface 4a of the rotary plug 4. The two recesses 29 and 30 constitute a cylindrical chamber, in which the centering disk 27 extends with a clearance. The axis of rotation of the centering disk 27 extends at right angles to the paper plane of FIG. 6 and coincides with the axis of rotation of the sealing member 5. At a distance from that axis of rotation the centering disk 27 has a bore 31, in which the compression spring 10 extends. This will ensure that the radial distance from the compression spring 10 to the axis of rotation of the sealing member 5 will be constant. During the movement of the rotary plug 4 the centering disk 27 will act as a coupling member for moving the sealing member 5 to its open or closed position.

In the embodiment of the shut-off mechanism shown in FIGS. 5 and 6 there is no fixed connection between the rotary plug 4 and the sealing member 5. The sealing member 5 has the shape of a spherical cap and the valve seat 11 and the guiding surface 28, which is provided on the inside surface of the housing, consist of spherical surfaces. As the sealing member 5 moves from its open to its closed position the spherical outside surface 5a of the sealing member will always slide on the spherical guiding surface 28 so that the distance between the sealing member 5 and the flat surface 4a of the rotary plug will be approximately constant. Owing to the sliding movement of the sealing member 5 along the guiding surface 28, any solids which have entered that region will be pushed off. Besides, said surfaces may be purged by means which are not shown. A purging passage as shown, e.g. in FIG. 2, may also open into the recess 30 of the rotary plug 4.

Figure 7:
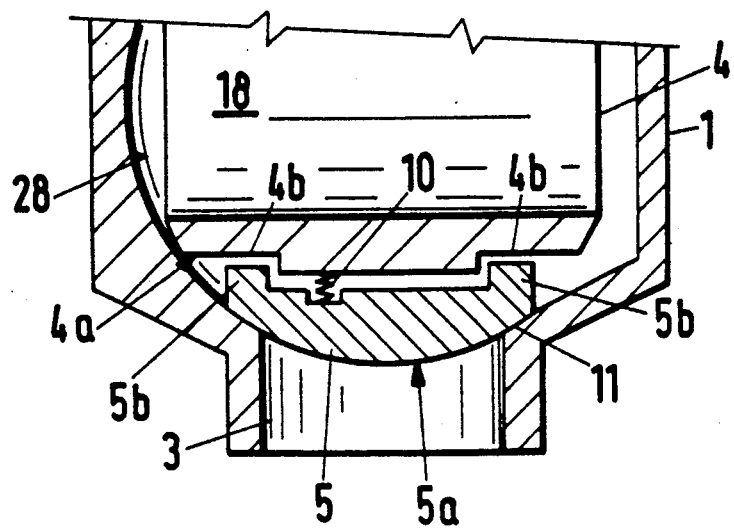
FIG. 7 is a longitudinal sectional view which is similar to FIG. 1 and shows a third embodiment of the rotary plug and of the sealing member.

In the embodiment shown in FIG. 7 the sealing member 5 and the rotary plug 4 are so shaped that the sealing member can rotate about its axis of symmetry. In that case the sealing member 5 has an annular projection 5b, which extends into an annular recess 4b in the flat surface of the rotary plug. The valve seat 11 and the spherical guiding surface 28 are shaped as described with reference to FIGS. 5 and 6 and cooperate with the spherical surface 5a of the sealing member. The compression spring 10 is laterally spaced from the axis of rotation and axis of symmetry of the sealing member and is arranged as has been described with reference to FIGS. 1 to 4 and 8.

We claim:

1. A shut-of device for controlling a flowable material, comprising:
   a housing;
   means forming an inlet on said housing for admitting a flowable material to said housing;
   means forming an outlet in said housing for discharging said flowable material, and defining in said housing an annular seat around said outlet;
   a rotary plug member in said housing having a central passage and rotatable about a first axis relative to said housing between an open position wherein said passage communicates between said inlet and said outlet to permit flow of said material and a closed position blocking flow of said material between said inlet and said outlet and closing said inlet;
   a sealing member rotatable relative to said plug member about a second axis generally at a right angle to said first axis, sealingly engageable with said seat in said closed position of said plug and rotated at least limitedly upon displacement of said plug member between said positions to vary orientation of said sealing member about said second axis relative to said seat; a compression spring braced between said members and having a spring axis spaced with a radial distance from said second axis so as to be wholly offset therefrom said spring being in slidable contact with at least one of said members.

2. The shut-off device defined in claim 1 wherein said sealing member comprises a spherical segmental cap and said housing has a guiding surface engaged by said cap and conforming to a spherical segmental surface thereof.

3. The shut-off device defined in claim 1 wherein said members have confronting recesses aligned along said second axis, said device further comprising a centering disk received in said recesses and movable relative to both said members in said recesses.

4. The shut-off device defined in claim 3, wherein said compression spring braced between said members is received in a bore in said centering disk.

5. The shut-off device defined in claim 1 wherein said sealing member has an annular projection extending into said plug member.

6. The shut-off device defined in claim 1, further comprising a sealing ring surrounding said inlet and braced against a surface of said plug member.

7. The shut-off device defined in claim 6, wherein said compression spring braced between said members is located close to said second axis.

8. The shut-off device defined in claim 7 wherein said sealing member comprises a spherical segmental cap and said housing has a guiding surface engaged by said cap and conforming to a spherical segmental surface thereof.

9. The shut-off device defined in claim 7 wherein said members have confronting recesses aligned along said second axis, said device further comprising a centering disk received in said recesses and movable relative to both said members in said recesses.

10. The shut-off device defined in claim 9 wherein said compression spring braced between said members is received in a bore in said centering disk.

11. The shut-off device defined in claim 7 wherein said sealing member has an annular projection extending into said plug member.

12. The shut-off device defined in claim 6 wherein a line for supplying a purging fluid opens between said members or adjacent said seat.

13. The shut-off device defined in claim 1 wherein a line for supplying a purging fluid opens between said members or adjacent said seat.

14. The shut-off device defined in claim 13 wherein said a compression spring braced between said members is located close to said second axis.

15. The shut-off device defined in claim 14 wherein said sealing member comprises a spherical segmental cap and said housing has a guiding surface engaged by said cap and conforming to a spherical segmental surface thereof.

16. The shut-off device defined in claim 14 wherein said members have confronting recesses aligned along said second axis, said device further comprising a centering disk received in said recesses and movable relative to both said members in said recesses.

17. The shut-off device defined in claim 14 wherein said compression spring braced between said members is received in a bore in said centering disk.

18. The shut-off device defined in claim 14 wherein said sealing member has an annular projection extending into said plug member.

* * * * *